United States Patent [19]
Schmidt

[11] Patent Number: 5,363,562
[45] Date of Patent: Nov. 15, 1994

[54] DIGITAL TAPER/PARALLEL GAUGE

[75] Inventor: George S. Schmidt, Schenectady, N.Y.

[73] Assignee: General Electric Company, Schenectady, N.Y.

[21] Appl. No.: 996,940

[22] Filed: Dec. 31, 1992

[51] Int. Cl.$^5$ .............................................. G01B 3/30
[52] U.S. Cl. ..................... 33/567.1; 33/567; 33/784
[58] Field of Search ............... 33/567.1, 567, 531, 33/544.4, 783, 784, 809, 810, 453, 536

[56] References Cited

U.S. PATENT DOCUMENTS

| | | | |
|---|---|---|---|
| 1,489,747 | 4/1924 | Edrany | 33/567.1 |
| 2,164,339 | 7/1939 | Morgan . | |
| 2,336,393 | 12/1943 | Combes . | |
| 2,372,368 | 3/1945 | Dierking | 33/567.1 |
| 2,642,670 | 6/1953 | Dow . | |
| 2,807,881 | 10/1957 | Özbilgic | 33/567.1 X |
| 2,994,961 | 8/1961 | Nakagawa . | |
| 3,247,598 | 4/1966 | Wilkes | 33/567.1 |
| 4,168,574 | 9/1979 | Chase | 33/567.1 |
| 4,473,952 | 10/1984 | Mariani . | |
| 4,505,042 | 3/1985 | Nishina | 33/505 |
| 4,539,755 | 9/1985 | Weimer . | |
| 4,556,199 | 1/1986 | Gruhler et al. . | |
| 4,845,646 | 7/1989 | Marquis et al. . | |
| 5,022,162 | 6/1991 | Luikko . | |
| 5,063,687 | 11/1991 | Olshefsky . | |

OTHER PUBLICATIONS

"An Improved Precision Height Gage", Technology Utilization Report, NASA SP-5001, Nov. 1963. pp. 4-6.

*Primary Examiner*—William A. Cuchlinski, Jr.
*Assistant Examiner*—Alvin Wirthlin
*Attorney, Agent, or Firm*—Nixon & Vanderhye

[57] ABSTRACT

An opening clearance measuring tool that functions as a combination taper gauge and parallel gauge includes a wedge-shaped "taper block", a sliding linear scale predisposed to parallel movement along an upper edge of the taper block, and a digital read-out linear scale measuring and display unit that accurately measures a translational displacement of the sliding scale with respect to the taper block and displays the displacement in millimeters. The angle between the upper and lower edge surfaces of the taper block forms the wedge of the tool and defines the particular slope or "taper" for the gauge. The slope is predetermined to incorporate a linear conversion factor between metric and English units so that the display may be used to indicate clearance measurements expressed in mils. The scale measuring and display unit is fixedly secured to the taper block and, as the linear scale slider is moved past (through) the scale display unit, the translational displacement of the slider is measured and displayed. This information may also be provided via electrical connection/communication to an external "data logger" device for further manipulation and storage. The scale slider also includes a set of parallel tapered steps of precise predetermined increments at one end to enable using the tool as a parallel gauge capable of accommodating plural ranges of clearance measurements.

11 Claims, 2 Drawing Sheets

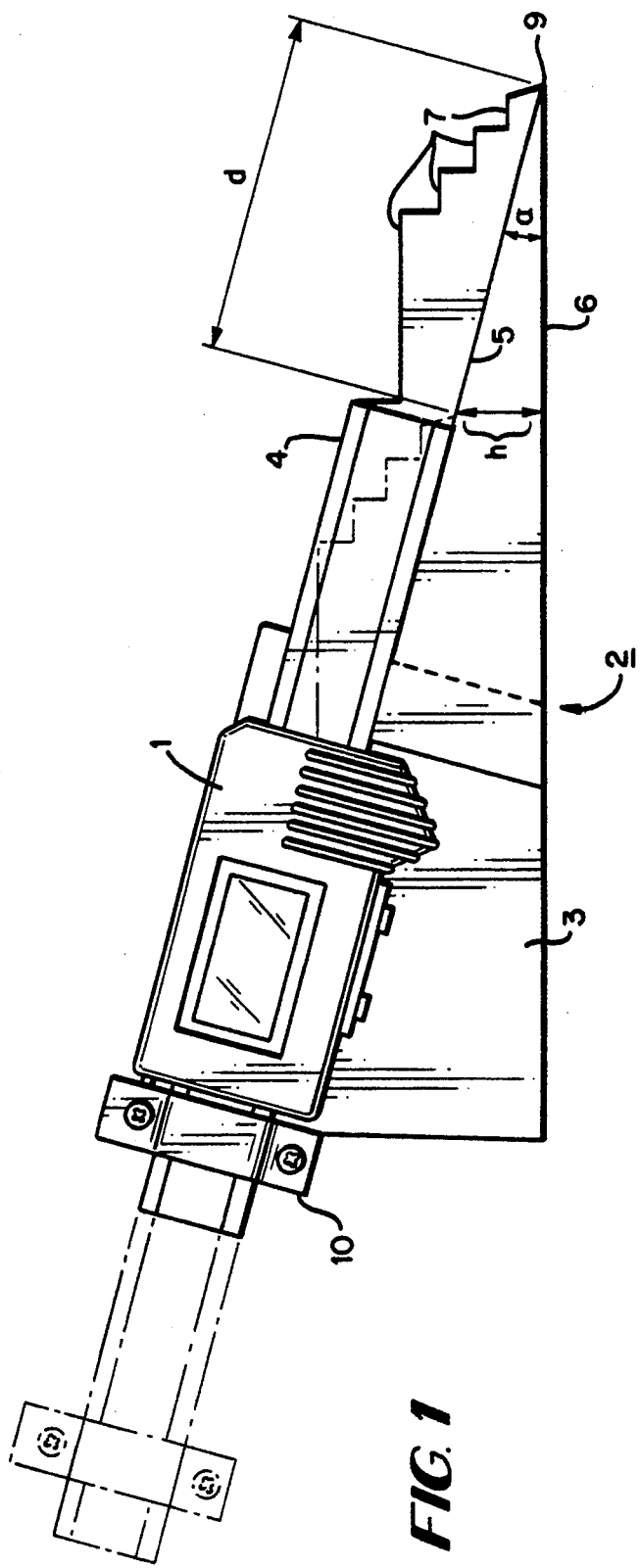
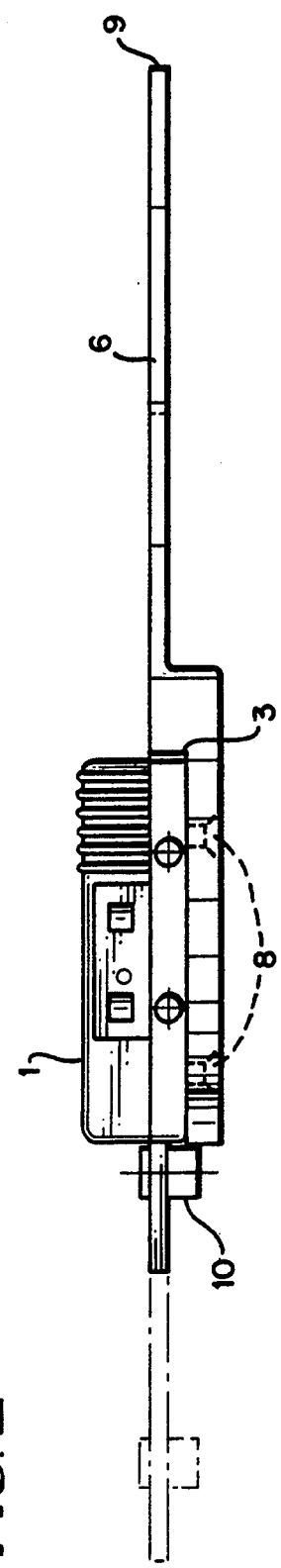
FIG. 1
FIG. 2

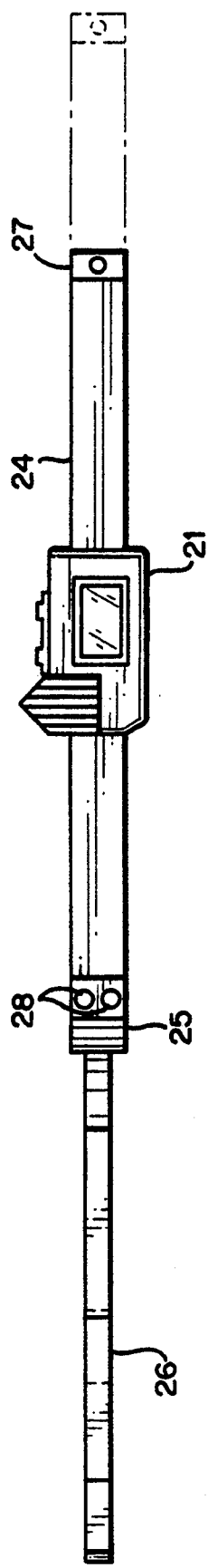
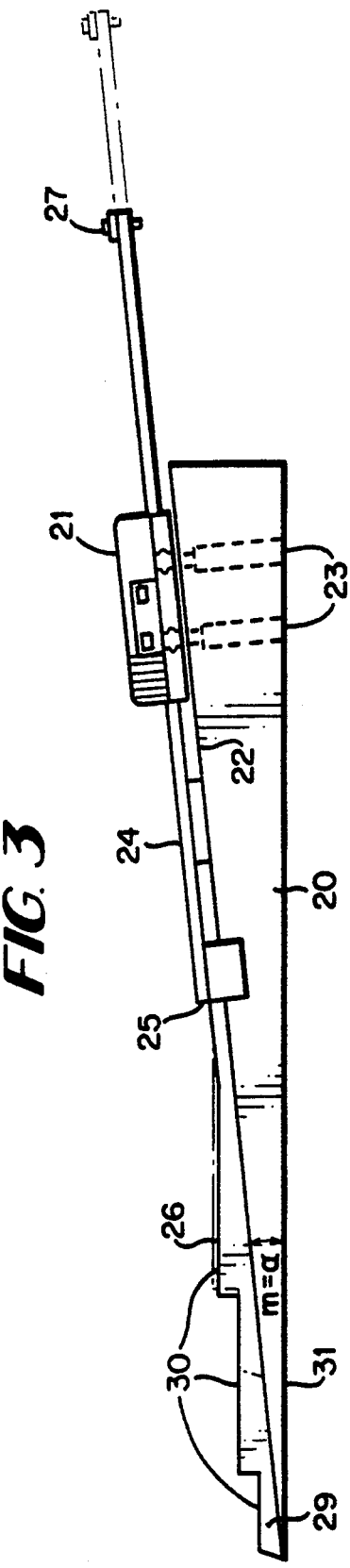
FIG. 4
FIG. 3

DIGITAL TAPER/PARALLEL GAUGE

FIELD OF THE INVENTION

This invention relates generally to a tool for measuring clearances and, in particular, to a combination taper gauge and parallel gauge tool with a digital read-out which will accommodate a hand-held data logger for automatically recording measurements. More specifically, the invention relates to a combination taper/parallel gauge for measuring opening clearances in turbine engines.

BACKGROUND AND SUMMARY OF THE INVENTION

During the servicing and maintenance of turbine engines, in order to minimize down time, it is often desirable to quickly determine the general condition of the turbine and to find problem areas as soon as it is opened. This requires an ability to quickly access internal components and to conveniently obtain and accurately record a number of precise measurements of component clearances. For example, upon removal of the top half of a turbine rotor housing, it may be necessary to measure opening clearances between two surfaces such as: (1) wheel clearances between the turbine rotor and housing; (2) rotor position checks; (3) thrust clearances; and (4) gib key clearances. Such measurements are often indicative of the general condition of a turbine and provide needed information for the proper diagnosis of potential problem areas. Since turbine downtime is often costly to the customer, it is imperative that such measurements be taken as quickly and accurately as possible, particularly in those cases where the rotor is to be removed from the housing. Likewise, when closing the turbine housing, it is again important to take measurements quickly and accurately so as to insure that the reinstalled rotor is correctly and accurately located.

In the past, these measurements were taken with various types of taper gauges and parallel gauges which proved time consuming to use and difficult to read. For example, in order to obtain measurements to the desired degree of accuracy, a conventional taper gauge must be relatively long and have a very slim taper (i.e., a small slope) to obtain readings. This often causes a problem with "bottoming out", particularly at the tip of the rotor where a taper gauge inserted to measure a radial clearance will interfere with the housing. In order to overcome this problem it would be possible to use a number of different-sized shorter and truncated tapers. Alternatively, a curved taper gauge could be manufactured to conform to the radius of the turbine to avoid interference with the housing. However, curved gauges are very expensive and the other alternative of using numerous shorter sized truncated tapers is time consuming and cumbersome.

Moreover, for larger openings or clearances, a "parallel" gauge is often required. This type of gauge requires insertion of the gauge into the opening and then extending the parallel gauge surfaces until contact is made. The gauge is then locked and carefully withdrawn so that the distance between its parallel surfaces may be measured with a micrometer. Obviously, this is a time-consuming and error-prone process. As a result and due to these problems, maintenance personnel often forego taking many crucial and useful measurements.

In accordance with a preferred exemplary embodiment of the invention, the digital taper/parallel gauge includes a flat wedge-shaped taper block in combination with a commercially available linear scaling device incorporating a digital scale display unit mounted on one side of the taper block, a scale slider having one end modified to provide a series of tapered steps, and a slide stop piece attached to the opposite end of the scale slider. To measure a particular clearance, the gauge is inserted into the opening or gap until the taper block fills the space. In doing so, the scale slider is displaced with respect to the taper block and scale display unit assembly by the amount the taper block is inserted. The amount of scale slider travel is measured and an indication is provided on the scale display unit.

Moreover, since the amount o scale slider travel (i.e., the displacement of the slider when the gauge is inserted into the opening) is directly related to the clearance at that point (i.e., it is a linear function directly related to the slope of the taper), the taper block can be designed with almost any selected desired conversion factor incorporated into the slope of the taper block wedge enabling the scale display unit to provide read-out conversions between differing units of measurement directly. In addition, the tapered step surfaces at one end of the scale slider are sloped in the opposite direction as the slope of the taper block so that the top surfaces of the steps are parallel with the bottom edge of the taper block. This arrangement serves to provide multiple sets of parallel surfaces that may be used to extend the useful measurement range of the gauge. Essentially, the tapered steps effectively provide measuring surfaces of selectable starting thicknesses so as to allow use of gauge where a longer taper block would otherwise "bottom out" or impinge on some internal obstruction before the tapered wedge portion of the block fills the gap. A slide-stop piece is also fitted at the opposite end of the scale slider to act as an end stop and a zero reference point.

In an alternative embodiment, the scale display unit and slider are mounted orthogonal to the sides of the taper block along its sloped edge. An interchangeable end-slide piece is removably attached at one end of the scale slider and functions as one-half of a set of parallel measuring surfaces (the other half being the bottom edge of the taper block) as well as a stop for the taper gauge. The end slide piece is likewise provided with stepped tapered surfaces of the same slope, albeit in the opposite direction, as that of the taper block. Several end-slide variations containing none, one or more steps are contemplated to accommodate a variety of measurement ranges.

More specifically, accordance with a preferred exemplary embodiment of the invention, a digital taper/parallel gauge tool comprises a wedge-shaped (taper block) body portion having a sloped edge and a bottom edge, a digital scale display unit fixedly secured to said taper block, a movable scale slider portion operatively associated with said digital scale unit, said scale slider capable of translational displacement along said sloped edge of the taper block, said scale slider having at least one tapered edge surface of the same slope but opposite direction as that of said sloped edge of said taper block such that said tapered edge of the slider and said bottom edge of the taper block form parallel surfaces of variable separation, and said digital scale unit measuring the amount of translational displacement of said scale slider with respect to said taper block and displaying an indication of the orthogonal distance between said bottom edge and said sloped edge of the taper block at a position determined by one end of said scale slider.

It is, therefore, a principal object of this invention to make turbine rotor clearance measurements more easily, accurately and quickly. It is also another object of this invention to provide a combination taper/parallel gauge capable of measuring a large range of opening clearances. It is also a further object of this invention to provide an inexpensive, accurate and ergonomic gauge tool for measuring opening clearances in turbine engines. Other objects and advantages of the invention will become apparent from the detailed description which follows.

BRIEF DESCRIPTION OF THE DRAWINGS

Reference will hereinafter be made to the accompanying drawings wherein like reference numerals throughout the various FIGURES denote like elements, and wherein:

FIG. 1 is a side view of the digital taper/parallel gauge in accordance with a preferred exemplary embodiment of the present invention;

FIG. 2 is a top view of the digital taper sized parallel gauge as depicted in FIG. 1;

FIG. 3 is a side view of an alternative embodiment of the taper/parallel gauge in accordance with the present invention; and FIG. 4 is a top view of the alternative embodiment of the taper/parallel gauge depicted in FIG. 3.

DETAILED DESCRIPTION OF THE DRAWINGS

Referring to FIG. 1, a preferred exemplary embodiment of the taper/parallel gauge tool in accordance with the present invention is depicted in various operative positions indicated by the solid and broken lines. A wedge-shaped taper block 2 forms a base portion that supports a conventional linear scale measuring device having a digital read-out and display. The digital scale unit portion 1 of the linear scale measuring device is secured to taper block 2 and prevented from movement by a pair of mounting screws from the opposite side of the taper block (not shown in FIG. 1). Scale unit 1 is mounted in recessed portion 3 of taper block 2 such that sliding ruler scale portion 4 of a linear scale measuring device is aligned parallel to and maintained in sliding contact with upper edge 5 of taper block 2. Translational displacement of scale slider 4 with respect to scale unit 1 and taper block 2 along upper edge 5 of the taper block (as indicated by broken line slider position depicted in FIG. 1) is measured and displayed by scale unit 1.

One end of scale slider is modified or manufactured to include a series of tapered steps having upper edge surfaces 7 that are parallel to lower edge surface 6 of taper block 2. In a preferred exemplary embodiment of the present invention, taper block 2 is manufactured having a wedge shape of a specifically determined angle. Accordingly, the upper edge surface 5 of the taper block has a particular predetermined slope with respect to the lower edge surface 6. Specifically, the angle of the wedge shape is carefully chosen such that the slope between measuring edge surfaces 5 and 6 of taper block 2 inherently incorporates a desired units conversion factor between different units of measurement.

Before taking any measurements, the front end of scale slider is positioned flush with wedge tip 9 of the taper block and the display of digital scale unit 1 is zeroed. An adjustable slide stop piece 10 is provided at the opposite or rear end of scale slider 4 and may be used as a return stop or starting position marker. The front end 9 of the gauge is then inserted into an opening until the opening is filled by the taper block wedge portion. In doing so, front end 9 of scale slider 4 is displaced with respect to taper block body 2 along upper edge surface 5. This translational displacement of scale slider 4 is measured and displayed by digital scale unit 1. Since the amount of displacement D is directly related to the amount of the wedge filling the opening at that point, the opening clearance, h, can be calculated from the following relationship:

$$h = \frac{1}{\left(1 + \frac{1}{m^2}\right)^{\frac{1}{2}}} \cdot d$$

where, m = the slope of upper edge 5 with respect to lower edge 6 of the taper block, d = the distance scale slider is displaced along upper edge 5 of the taper block, and h = the clearance measured (which corresponds to the orthogonal distance from lower edge surface 6 of the taper block to upper edge surface 5 at the position to which end-point 9 scale 4 is displaced).

Although the slope could be selected from a wide range of values, the resulting measurements will be more accurate if the taper gauge has a slope of less than 0.5. However, for slopes less than 0.1, the taper of the wedge is very slight and this results in an unacceptably elongated gauge shape. In a preferred exemplary embodiment of the present invention, digital scale unit 1 measures translational displacements of scale slider 4 in millimeters (i.e., metric units) and provides a digital read-out in thousandths of an inch or mils (i.e., English units). A particular slope, m, is chosen such that the translational displacement, d, measured in metric units is equal to the measured clearance, h, expressed in mils (i.e., thousandths of an inch) divided by a "convenient" factor of ten. For example, if in the above formula a slope of m=0.262 (corresponding to wedge angle α=14.714°) is used, the amount of scale slider displacement, as measured in millimeters, will be related to clearance expressed in mills by a factor of ten. In other words, the digital scale unit read-out is multiplied by ten (i.e., the decimal point as displayed is moved one place to the right) the display indicates the measured clearance, h, expressed in mils. This greatly simplifies visual reading of the display. Moreover, a slope of 0.262 allows for accurate readings without requiring an excessively-elongated gauge tool.

Tapered step surfaces 7 along upper edge of scale slider 4 form a set of surfaces parallel to lower edge surface 6 of taper block 4. In addition, front end 9 of scale slider is tapered a few degrees toward the rear of the scale to prevent the front edge of the lowest step from introducing minor displacement errors when measurements are taken. In the preferred embodiment, each of steps 7 serves to increase the measurable range of clearance, h, by 200 mils. In this respect, each tapered step edge surface is used as one-half of a set of parallels in the manner of a parallel gauge. For example, a particular step surface is chosen and partially inserted into an opening to be measured. Taper block 4 is then inserted until it fills the remaining opening. The indicated digital read-out is multiplied by ten and a value of 200.00 (mils) is added for each step utilized above bottom edge of scale slider 4.

An external "data logger" may be electronically connected to scale unit 1 and with appropriate programming will avoid the necessity of multiplying by 10 and, in the case of a parallel step measurement, of adding 200.00 mils to the read out. In addition, the gauge may be provided or manufactured with a variety of different scale slider pieces having various combinations of tapered parallel steps. Moreover, it is contemplated that an alternate embodiment of the tool might utilize a different slope value or wedge angle to accommodate a particular conversion factor between different sets of units.

FIG. 2 shows a bottom view of the taper/parallel gauge depicted in FIG. 1. Digital scale unit 1 is shown secured by mounting screws 8 within recess 3 of taper block 2.

FIGS. 3 and 4 show side and top views, respectively, of an alternate embodiment of the taper/parallel gauge in accordance with the present invention. Referring to FIG. 3, taper block 20 has the same wedge shape as previously discussed above, but is basically flat and lacks the recessed section of the above embodiment. Digital scale unit 21 is mounted on upper edge surface 22 of taper block 20 and secured by mounting screws set in recessed bore holes 23. Scale slider portion 24 is secured at scale slider front end 25 to end-slide piece 26 via mounting screws 28 (FIG. 4). The rear end of scale slider 24 is also provided with adjustable slide stop piece 27. End-slide 26 has a tapered upper edge surface 29 that is parallel to lower edge surface 31 of taper block 20. Likewise, end-slide 26 may include one or a series of parallel tapered steps 30, as discussed with respect to the above embodiment, enabling its use as a parallel gauge.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A combination taper/parallel gauge device for measuring the distance between two opposing surfaces, comprising:
   a wedge-shaped, taper-block member having a wedge-tip portion which is of narrow cross-section relative to a height of said taper-block said wedge-tip portion having an upper edge surface and a bottom edge surface, said upper edge surface having a predetermined slope with respect to said bottom edge surface;
   a sliding-ruler scale movement measuring member having an integral digital display, said scale movement measuring member fixedly secured to a portion of said taper block;
   a movable sliding-ruler scale slider portion operatively associated with said scale movement measuring unit;
   said scale slider being freely movable and capable of translational displacement along said upper edge of the taper block;
   said scale slider having at least one tapered upper edge surface of the same predetermined slope but of opposite direction with respect to said upper edge surface of the taper-block such that said tapered upper edge surface of the slider and said bottom edge surface of the taper-block form parallel surfaces of variable separation; and
   said scale movement measuring member indicating the amount of linear translational displacement of said scale slider with respect to said taper block.

2. A measuring device as set forth in claim 1 wherein said scale movement measuring member provides a numerical indication of the orthogonal distance from said bottom edge surface to said upper edge surface of said taper-block at a position determined by one end of said slider.

3. A device for measuring the distance between two opposing surfaces, comprising:
   a wedge-shaped base section having an upper surface and a lower surface, a substantial portion of which is of a cross-section of less than 0.25" in width;
   a digital read-out having means for measuring and displaying a translational displacement of a linear-scale slider, said displacement measuring means fixedly secured to a portion of said base;
   a substantially flat, linear-scale slider means operatively associated with said displacement measuring means;
   said slider means being freely movable with respect to said displacement measurement means and capable of substantially unimpeded translational displacement with respect to one surface of said base;
   said displacement measuring means indicating the amount of translational displacement on said digital read-out of said slider means with respect to said base.

4. The measuring device as set forth in claim 3 wherein said displacement measuring means further comprises a means for providing an indication of the orthogonal distance from said lower surface to said upper surface of said wedge-shaped base at a position determined by one end of said slider means.

5. The measuring device as set forth in claim 3 wherein said wedge-shaped bare has a predetermined slope between said upper and lower surfaces such that the numerical value of said slope is substantially equivalent to the numerical value of a conversion factor for converting between at least one pair of different conventional units of linear measurement.

6. The measuring device as set forth in claim 5 wherein said pair of different units of linear measurement comprise English units and Metric units.

7. A combination taper/parallel gauge device, comprising:
   a wedge-shaped base member having a substantial flat portion of relatively narrow cross-sectional profile with respect to its height, and having a predetermined slope angle between two surfaces forming said wedge shape;
   a slider portion freely movable along a first surface of said two surfaces; and
   slider displacement digital read-out means for measuring and displaying movements of said slider portion with respect to said base portion, said slider displacement digital read-out means fixedly secured to said first surface of said base portion.

8. A gauge device as set forth in claim 7 wherein said slider displacement read-out means includes a means for displaying an indication of a distance measured orthogonally from a second surface forming said wedge shape with said first surface to a position on said first surface determined by one end of said slider.

9. A gauge device as set forth in claim 7 wherein said predetermined slope angle is substantially equivalent to the numerical value of a conversion factor for converting between at least one pair of different conventional units of linear measurement.

10. The gauge device as set forth in claim 9 wherein said pair of different units of linear measurement comprise English units and Metric units.

11. The gauge device as set forth in claim 7 wherein said slider portion comprises tapered step portions for forming a plurality of parallel surfaces of predetermined separations from said first surface.

* * * * *